(12) United States Patent
Mitsuishi et al.

(10) Patent No.: US 9,996,121 B2
(45) Date of Patent: Jun. 12, 2018

(54) CABLE HOLDER

(71) Applicant: FUJITSU LIMITED, Kawasaki-shi, Kanagawa (JP)

(72) Inventors: Noriko Mitsuishi, Kawasaki (JP); Noboru Izuhara, Ota (JP); Junichi Hayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/420,743

(22) Filed: Jan. 31, 2017

(65) Prior Publication Data
US 2017/0242460 A1 Aug. 24, 2017

(30) Foreign Application Priority Data
Feb. 22, 2016 (JP) ................. 2016-030976

(51) Int. Cl.
*H02B 1/20* (2006.01)
*G06F 1/18* (2006.01)
*H02G 3/04* (2006.01)

(52) U.S. Cl.
CPC .............. *G06F 1/183* (2013.01); *G06F 1/181* (2013.01); *H02G 3/0456* (2013.01)

(58) Field of Classification Search
CPC .......... G06F 1/183; G06F 1/181; G06F 1/184; H02G 3/0456

USPC ................................................. 361/825–826
See application file for complete search history.

(56) References Cited

U.S. PATENT DOCUMENTS

| 5,625,737 | A | 4/1997 | Saito | |
|---|---|---|---|---|
| 6,353,697 | B1* | 3/2002 | Daoud | G02B 6/4454 385/135 |
| 7,734,139 | B2* | 6/2010 | Rector, III | G02B 6/4459 174/95 |
| 2011/0216510 | A1 | 9/2011 | Matsumura et al. | |
| 2013/0108220 | A1* | 5/2013 | Gonzalez Garcia | G02B 6/3672 385/78 |
| 2014/0043781 | A1 | 2/2014 | Matsumura et al. | |
| 2014/0055016 | A1* | 2/2014 | Nishikawa | H05K 5/0247 312/223.6 |

FOREIGN PATENT DOCUMENTS

| JP | 9-311258 | 12/1997 |
|---|---|---|
| JP | 2004-29701 | 1/2004 |
| JP | 2004-281678 | 10/2004 |
| JP | 2011-211172 | 10/2011 |

* cited by examiner

*Primary Examiner* — Hung S Bui
(74) *Attorney, Agent, or Firm* — Staas & Halsey LLP

(57) ABSTRACT

There is provided a cable holder including: a first holder configured to house a cable; and a second holder configured to house the cable, the second holder being at least partly housed in the first holder, wherein the second holder is held by the first holder, and drawn along the first holder.

15 Claims, 14 Drawing Sheets

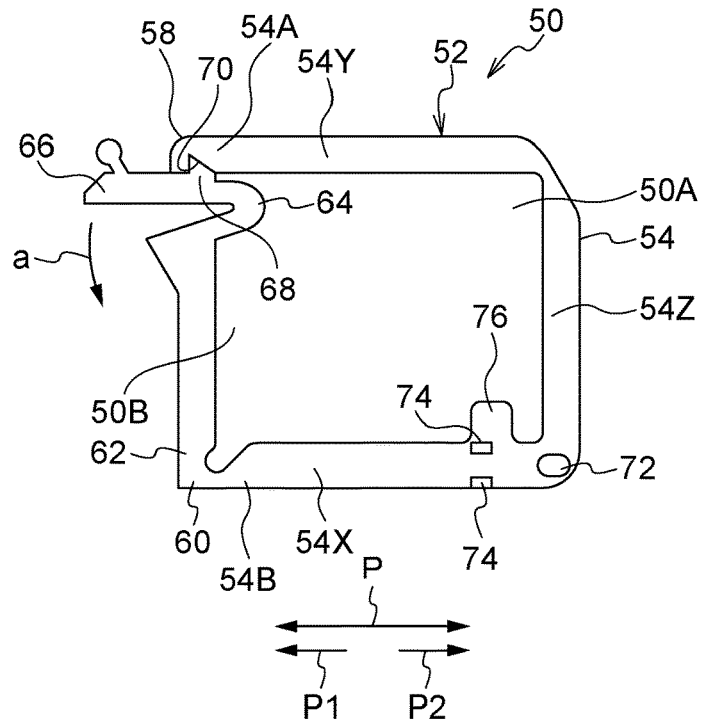
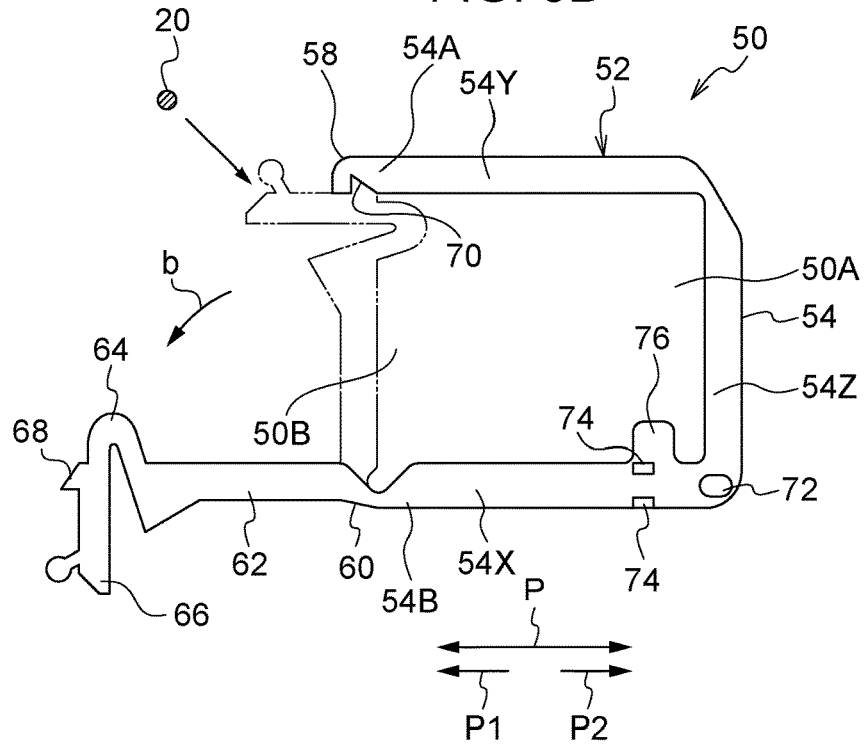

CABLE HOLDER

CROSS-REFERENCE TO RELATED APPLICATION

This application is based upon and claims the benefit of priority of the prior Japanese Patent Application No. 2016-030976, filed on Feb. 22, 2016, the entire contents of which are incorporated herein by reference.

FIELD

The embodiments discussed herein are related to a cable holder.

BACKGROUND

There are cable holders for housing cables (for example, see Japanese Laid-open Patent Publication Nos. 9-311258, 2004-29701, 2004-281678, and 2011-211172).

SUMMARY

According to an aspect of the invention, a cable holder includes: a first holder configured to house a cable; and a second holder configured to house the cable, the second holder being at least partly housed in the first holder, wherein the second holder is held by the first holder, and drawn along the first holder.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A is a side view depicting the leading movable holder illustrated in FIG. 7;

FIG. 8B is a side view depicting a state where a housing opening of the leading movable holder illustrated in FIG. 8A is opened;

DESCRIPTION OF EMBODIMENTS

A cable holder generally includes a plurality of cable housing parts for housing cables. In the cable holder, one cable is housed in each of the cable housing parts. Thus, a plurality of cables may be held without getting entangled.

However, forming a plurality of cable housing parts in the cable holder may lead to up-sizing of the cable holder.

Hereinafter, one embodiment of a technique for down-sizing the cable holder is described.

Figure 1:
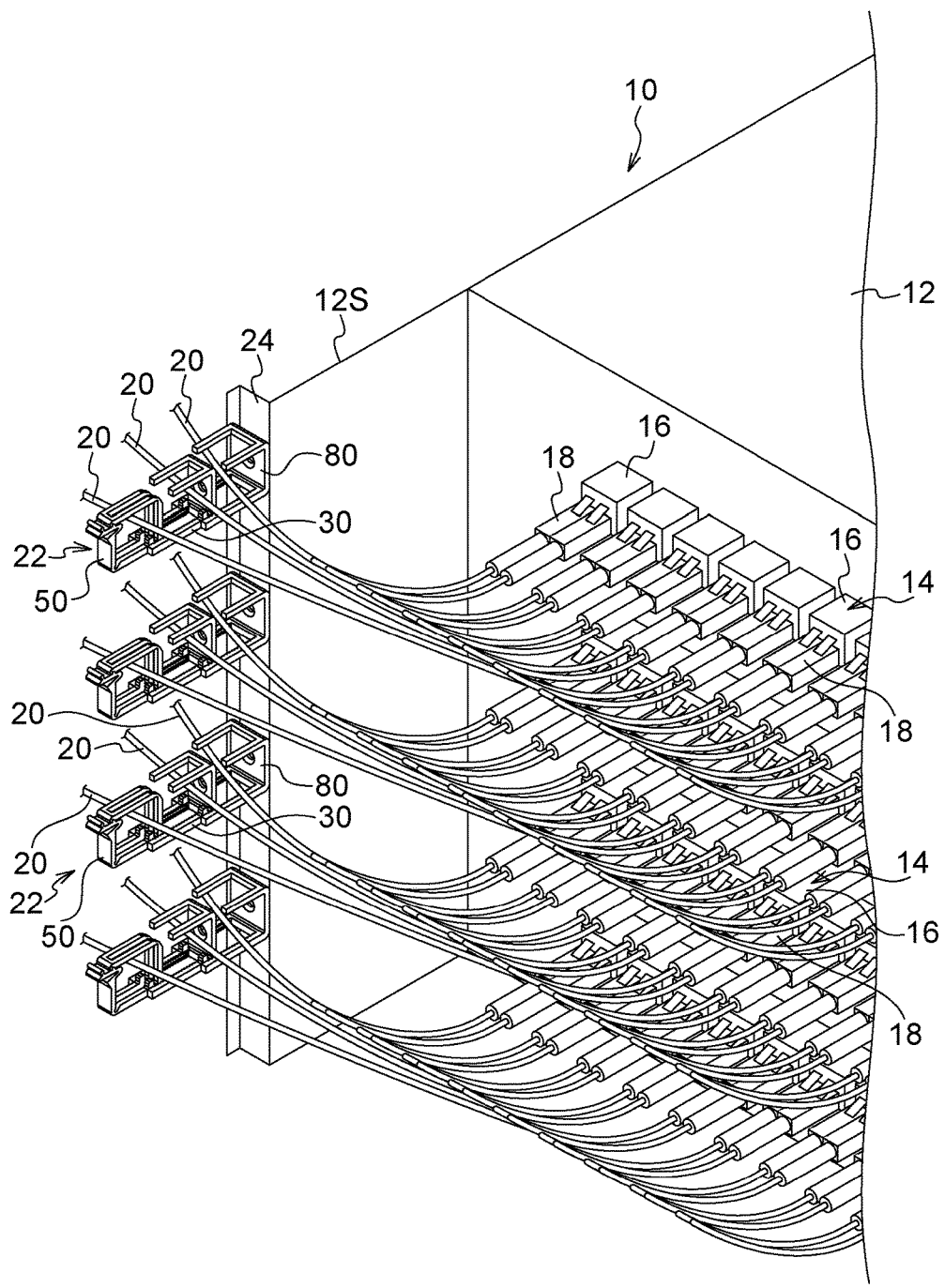
FIG. 1 is a perspective view depicting an information processing apparatus in which a cable holder according to one embodiment is mounted.

As illustrated in FIG. 1, a cable holder 22 according to this embodiment is mounted, for example, in an information processing apparatus 10. The information processing apparatus 10 includes a casing 12 and a plurality of electronic devices 14 housed in the casing 12.

The casing 12 is formed into a box shape. The plurality of electronic devices 14 are housed within the casing 12 side by side in the height direction of the casing 12. Each of the electronic devices 14 includes a printed board (not illustrated) and a plurality of connectors 16 arranged along an end portion of the printed board. Each of the connectors 16 is connected with a connector 18 provided at the end portion of a cable 20.

[Cable Holder]

Figure 2:
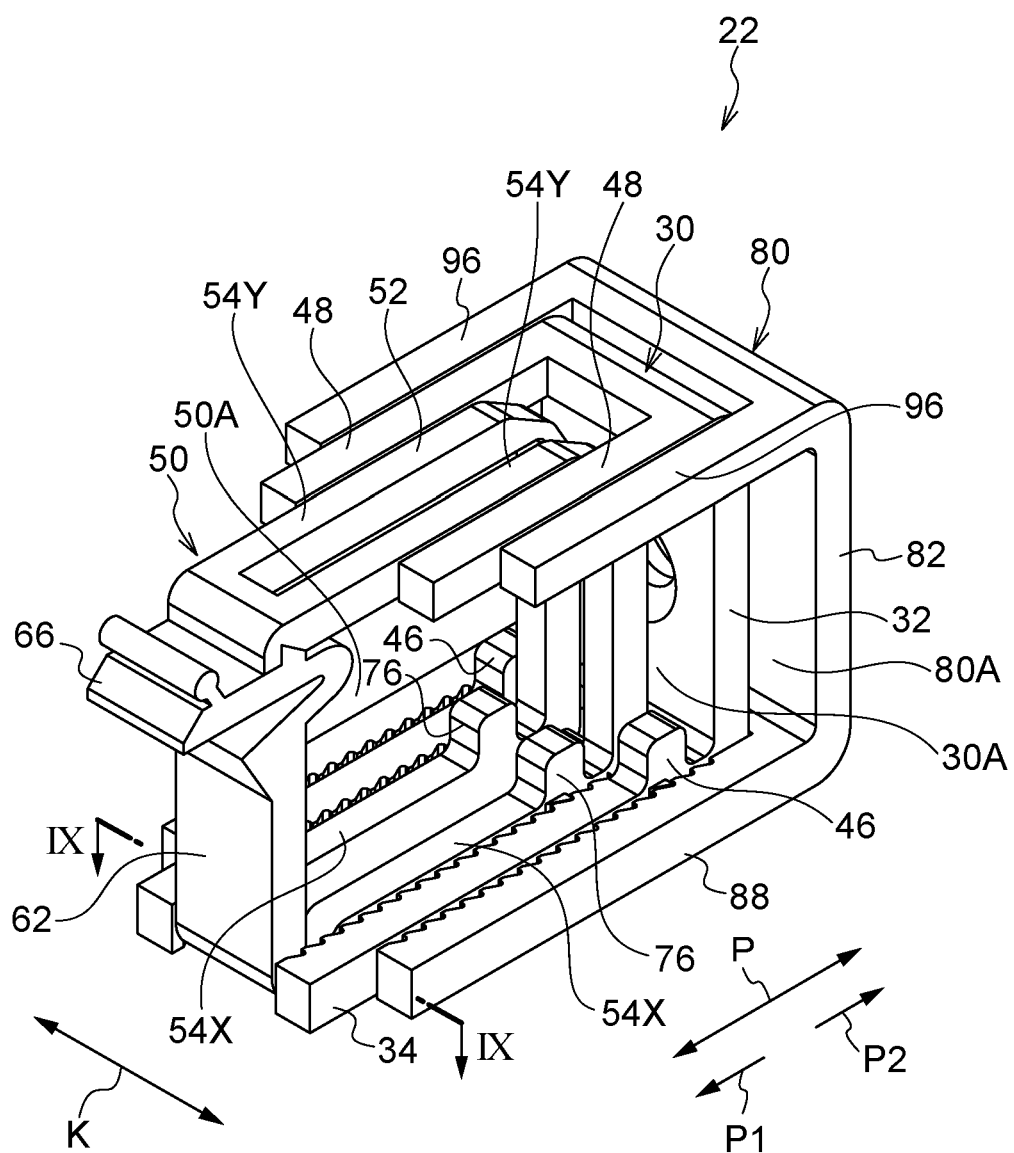
FIG. 2 is a perspective view depicting a state where an intermediate movable holder and a leading movable holder of the cable holder illustrated in FIG. 1 are located at a retracted position.
Figure 3:
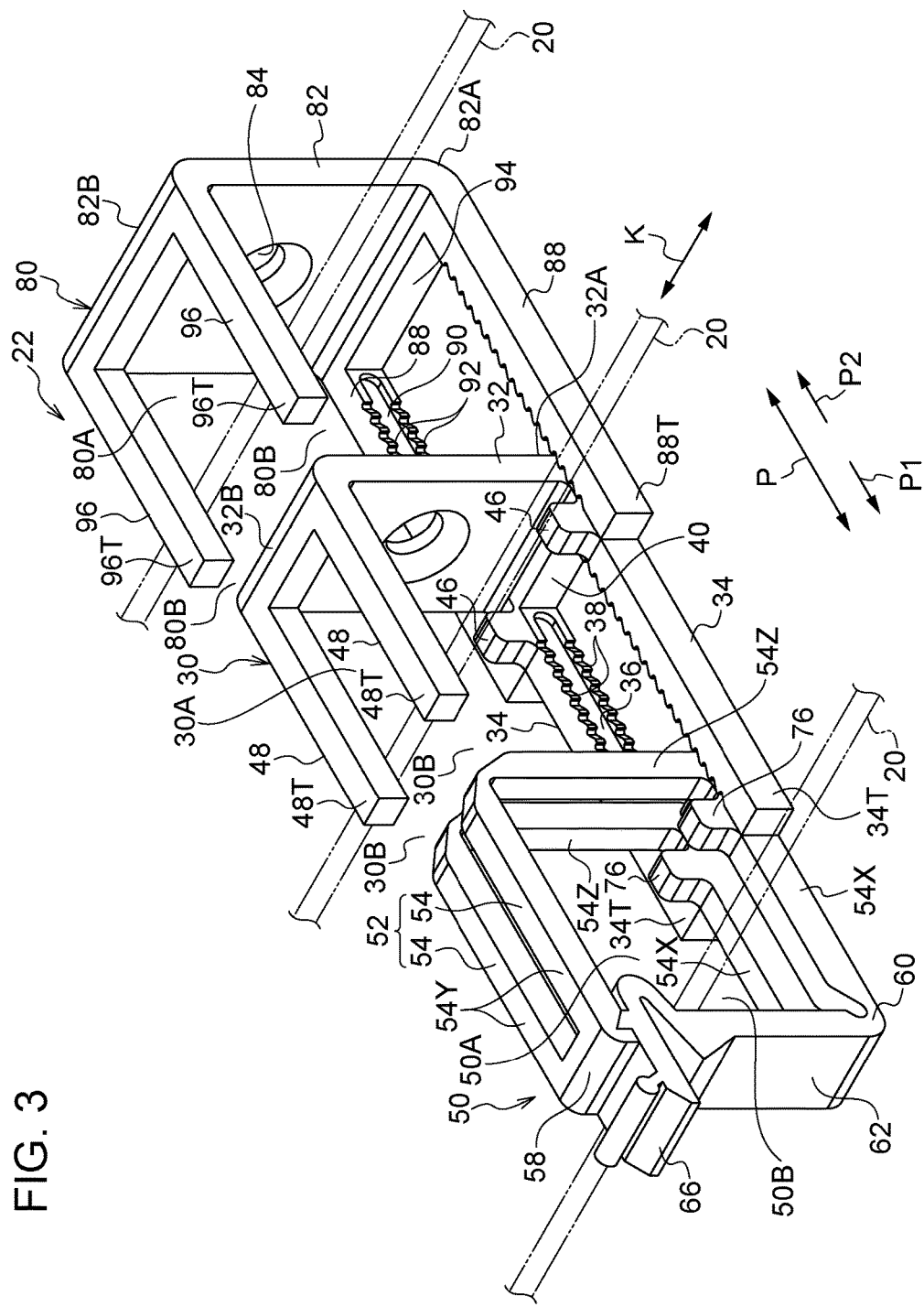
FIG. 3 is a perspective view depicting a state where the intermediate movable holder and the leading movable holder of the cable holder illustrated in FIG. 1 are located at an extended position.

The plurality of cable holders 22 for housing a plurality of cables 20 connected to the electronic devices 14 are mounted on a sidewall 12S of the casing 12. As illustrated in FIGS. 2 and 3, the cable holder 22 includes a fixed holder 80, an intermediate movable holder 30, and a leading movable holder 50.

Figure 4:
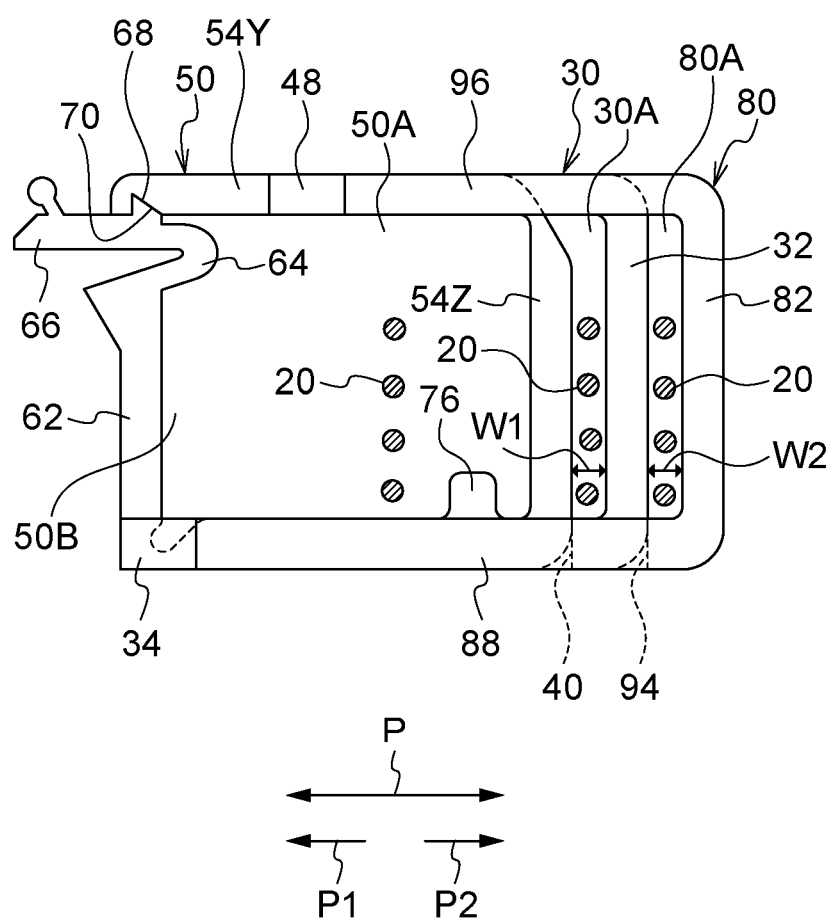
FIG. 4 is a side view depicting the cable holder illustrated in FIG. 2.
Figure 5:
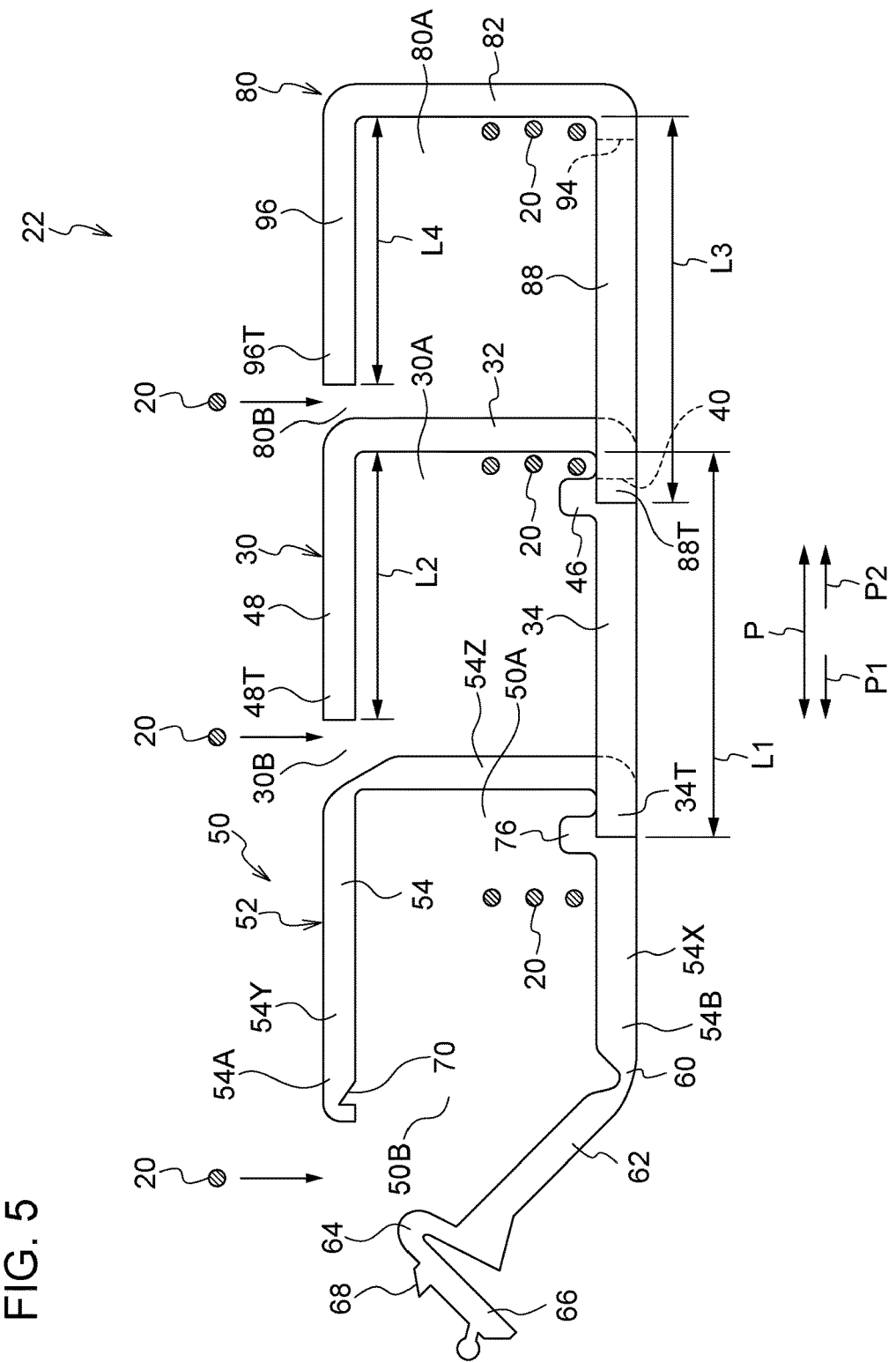
FIG. 5 is a side view depicting the cable holder illustrated in FIG. 3.

As illustrated in FIGS. 4 and 5, the fixed holder 80, the intermediate movable holder 30, and the leading movable holder 50 include cable housing parts 80A, 30A, and 50A for housing the cables 20, respectively. The cable 20 is housed in and extends through each of the cable housing parts 80A, 30A, and 50A. The cable 20 is a communication cable, power cable, or the like. The communication cable is, for example, an optical cable, conductor cable, or the like.

The fixed holder 80 is fixed to a flange part 24 (see FIG. 1) on the sidewall 12S of the casing 12. A portion of the intermediate movable holder 30 is housed in the cable housing part 80A of the fixed holder 80 in a drawable manner. The intermediate movable holder 30 moves between a retracted position (position illustrated in FIGS. 2 and 4) where the intermediate movable holder 30 is housed in the cable housing part 80A of the fixed holder 80 and an extended position (position illustrated in FIGS. 3 and 5) where the intermediate movable holder 30 is drawn from the cable housing part 80A so that a housing opening 80B (see FIG. 5) of the fixed holder 80 is able to be open or close.

The intermediate movable holder 30 is housed in the cable housing part 80A of the fixed holder 80 at the retracted position, and drawn from the cable housing part 80A of the fixed holder 80 at the extended position.

The leading movable holder 50 is partly housed in the cable housing part 30A of the intermediate movable holder 30 in a drawable manner. The leading movable holder 50 moves between a retracted position (position illustrated in FIGS. 2 and 4) where the leading movable holder 50 is housed in the cable housing part 30A of the intermediate movable holder 30 and an extended position (position illustrated in FIGS. 3 and 5) where the leading movable holder 50 is drawn from the cable housing part 30A to open or close a housing opening 30B (see FIG. 5) of the intermediate movable holder 30.

The leading movable holder 50 is housed in the cable housing part 30A of the intermediate movable holder 30 at the retracted position, and drawn from the cable housing part 30A of the intermediate movable holder 30 at the extended position.

The intermediate movable holder 30 is an example of a first holder. The leading movable holder 50 is an example of a second holder. The fixed holder 80 is an example of a third holder. Therefore, below description is given in the order of the intermediate movable holder 30, leading movable holder 50, and fixed holder 80. Arrow P illustrated in respective drawings indicates the moving direction of the intermediate movable holder 30 and leading movable holder 50. Arrow P1 indicates a direction (drawing direction) in which the intermediate movable holder 30 and leading movable holder 50 are drawn from the cable housing parts 80A and 30A. Arrow P2 indicates a direction (retracted direction) in which the intermediate movable holder 30 and leading movable holder 50 are housed in the cable housing parts 80A and 30A.

[Intermediate Movable Holder]

As illustrated in FIG. 3, the intermediate movable holder 30 includes a holder body 32, a pair of coupling arms 34, and a pair of guide arms 48. The holder body 32 is formed in a wall state. The holder body 32 is spaced out from the leading movable holder 50 in the moving direction (direction indicated by arrow P) of the leading movable holder 50. A cable housing part 30A is formed between (defined by) the holder body 32 and leading movable holder 50. The cable housing part 30A is expanded and contracted with movement of the leading movable holder 50.

The holder body 32 is an example of a first holder body 32. The cable housing part 30A is an example of a first cable housing part.

The pair of coupling arms 34 is disposed at one end 32A of the holder body 32 with a space interposed between the coupling arms 34. The pair of coupling arms 34 extends from the one end 32A of the holder body 32 to both sides of the leading movable holder 50. That is, the leading movable holder 50 is disposed between the pair of coupling arms 34. The pair of coupling arms 34 is an example of a pair of coupling extension parts.

Figure 6:
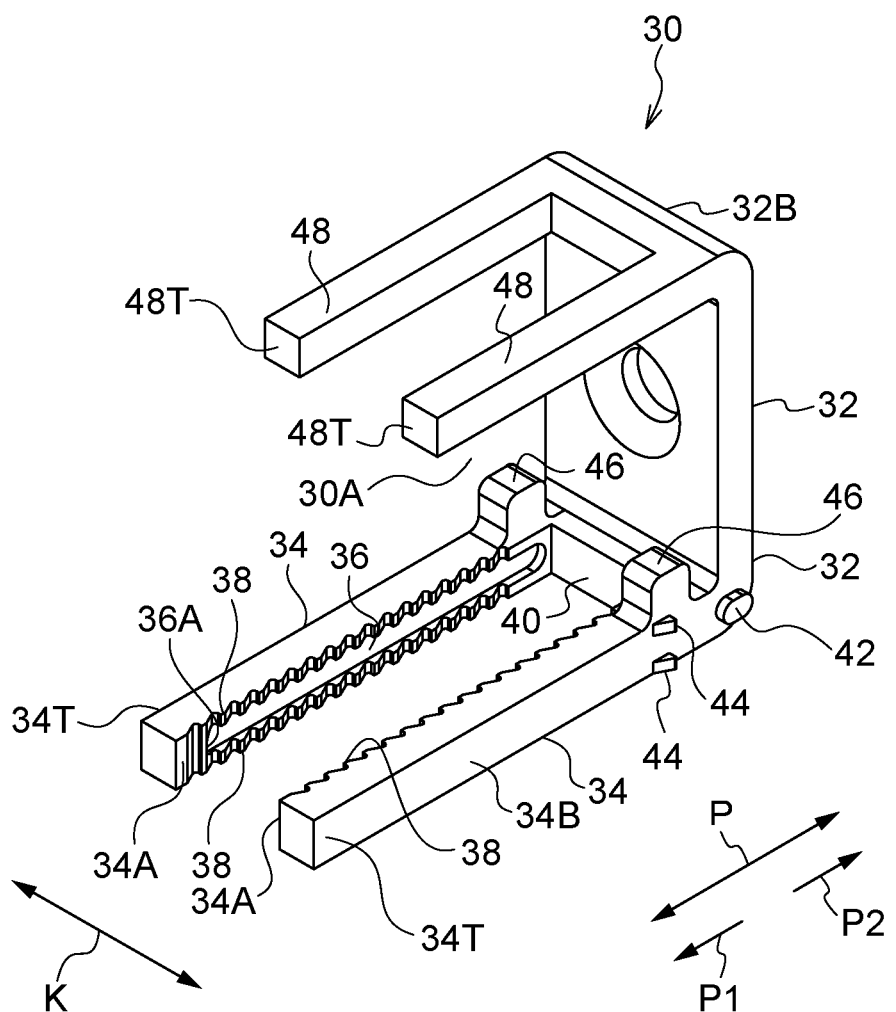
FIG. 6 is a perspective view depicting the intermediate movable holder illustrated in FIG. 2.

As illustrated in FIG. 6, the pair of coupling arms 34 includes a pair of inner side faces 34A facing each other. A guide groove 36 extending in the longitudinal direction of the coupling arms 34 is formed on each of the pair of inner side faces 34A. Slide projection parts 72 (see FIG. 7) of the leading movable holder 50 described below are inserted into the pair of guide grooves 36 in a slidable manner. A plurality of tooth parts 38 are formed on each of both sides of the guide groove 36 in each of the inner side faces 34A. The plurality of tooth parts 38 are arrayed in the longitudinal direction of the coupling arms 34. A claw part 74 (see FIG. 7) of the leading movable holder 50 described below is locked to each of the tooth parts 38.

A stopper part 40 is provided between the pair of coupling arms 34. The stopper part 40 is provided along the one end 32A of the holder body 32. The stopper part 40 is in contact with the leading movable holder 50 located at the retracted position.

The pair of coupling arms 34 includes outer side faces 34B facing inner side faces 88A (see FIG. 12) of a pair of coupling arms 88 of the fixed holder 80 described below. A slide projection part 42 and a pair of claw parts 44 are provided on each of the outer side faces 34B. Further, the pair of coupling arms 34 is provided with operating projection parts 46 configured to hold the cable 20 in conjunction with the holder body 32. The operating projection parts 46 project from holder body 32 sides of the coupling arms 34 into the cable housing part 30A.

As illustrated in FIG. 3, a pair of guide arms 48 is provided at another end 32B of the holder body 32 with a space interposed between the guide arms 48. The pair of guide arms 48 extends from the other end 32B of the holder body 32 to both sides of the leading movable holder 50. That is, the leading movable holder 50 is inserted between the pair of guide arms 48. The pair of guide arms 48 faces the pair of coupling arms 34, respectively. The cable housing part 30A is formed between (defined by) the pair of guide arms 48 and the pair of coupling arms 34.

The pair of guide arms 48 is an example of a pair of guiding extension parts. The cable housing part 30A is an area (space) enclosed by the holder body 32, coupling arms 34, guide arms 48, and a holder body 52 of the leading movable holder 50 described below.

[Leading Movable Holder]

Figure 7:
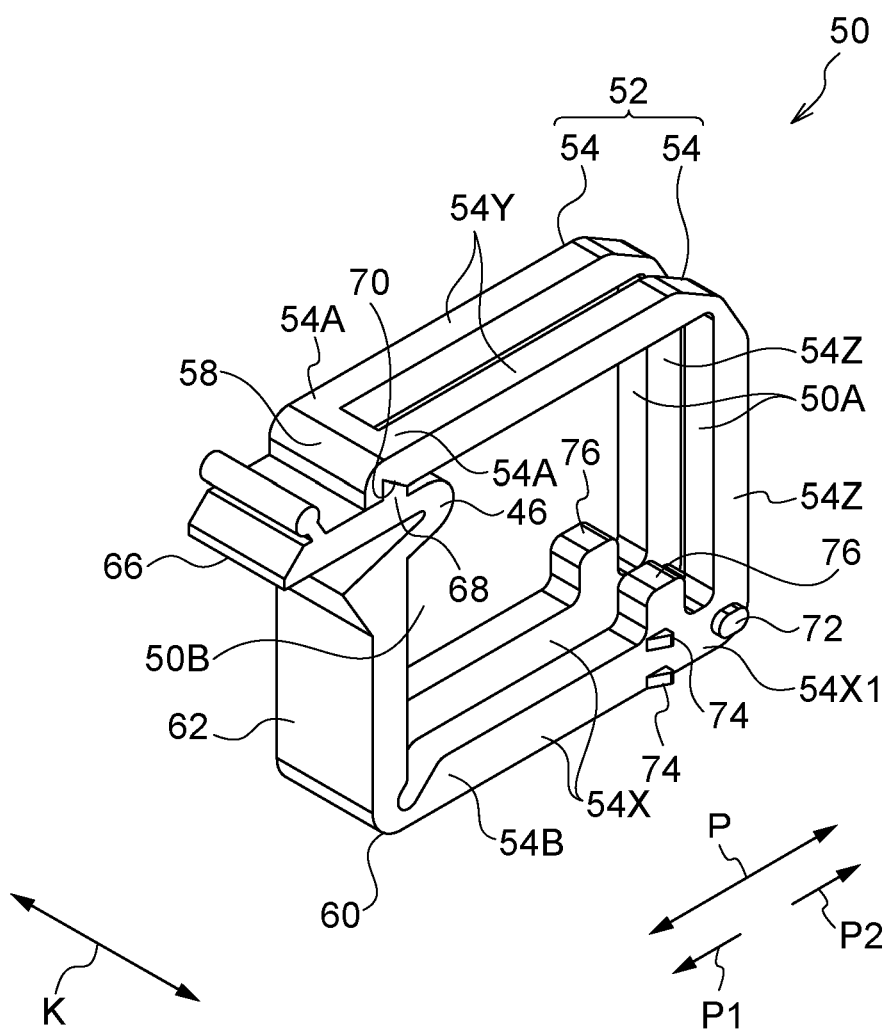
FIG. 7 is a perspective view depicting the leading movable holder illustrated in FIG. 2.

As illustrated in FIG. 7, the leading movable holder 50 includes a holder body 52 and a lid part 62. The holder body 52 includes a pair of frame-like parts 54. The pair of frame-like parts 54 is formed in a C shape having an opening on a side opposite to the intermediate movable holder 30 (see FIG. 3). A cable housing part 50A is formed inside each of the pair of frame-like parts 54. Each of the cable housing parts 50A is a rectangular area (space) enclosed by the frame-like part 54 and the lid part 62.

The pair of frame-like parts 54 is disposed to face each other in a direction in which the cable 20 passes through the inside of the cable housing parts 50A (routed direction or direction indicated by arrow K). A housing opening 50B communicating with the cable housing parts 50A is formed in the side of the pair of frame-like parts 54 opposite to intermediate movable holder 30.

As illustrated in FIGS. 8A and 8B, one ends 54A of the frame-like parts 54 on the side of the housing opening 50B are connected to each other via a beam-like part 58. On the other hand, other ends 54B of the frame-like parts 54 on the side of the housing opening 50B are connected with the lid part 62 via an open/close hinge 60.

The lid part 62 extends from the open/close hinge 60 to the one ends 54A of the pair of frame-like parts 54. The lid part 62 rotates with the open/close hinge 60 as a center to open or close the housing opening 50B of the holder body 52. The open/close hinge 60 is an example of a hinge part and an open/close mechanism.

A distal end part of the lid part 62 in the extending direction is connected with the operation piece 66 via a lock hinge 64. The operation piece 66 comes into or out of contact with the one ends 54A of the pair of frame-like parts 54 by being elastically deformed with the lock hinge 64 as a center. A locking claw 68 projecting to the side of the beam-like part 58 is formed on the operation piece 66.

On the other hand, a locking groove 70 into which a locking claw 68 is locked in a releasable manner is formed on the beam-like part 58. When the locking claw 68 is locked to the locking groove 70, the lid part 62 is held at a close position where the lid part 62 closes the housing opening 50B. On the other hand, when the operator rotates the operation piece 66 toward the lid part 62 (side indicated by arrow a of FIG. 8A) with the lock hinge 64 as a center, the locking between the locking claw 68 and the locking groove 70 is released. In this state, when the operator rotates the lid part 62 toward the outside (side indicated by arrow b of FIG. 8B) with the open/close hinge 60 as a center, the housing opening 50B is opened. Thus, the cable 20 may be housed in the cable housing parts 50A through the housing opening 50B.

The pair of frame-like parts 54 includes a pair of first slides 54X, a pair of second slides 54Y, and a pair of joining parts 54Z. The pair of first slides 54X and the pair of second slides 54Y extend in the moving direction of the leading movable holder 50, and are disposed to face each other. End portions of the intermediate movable holder 30 in the pair of first slides 54X and the pair of second slides 54Y is connected with each other by the joining parts 54Z. The first slide 54X is an example of a slide.

As illustrated in FIGS. 2 and 3, the pair of first slides 54X is disposed between a pair of coupling arms 34 of the intermediate movable holder 30. The pair of first slides 54X is coupled to the pair of coupling arms 34 in a slidable manner. The pair of first slides 54X slides in the moving direction (direction indicated by arrow P) of the leading movable holder 50 along the pair of coupling arms 34.

The pair of second slides 54Y is disposed between a pair of guide arms 48 of the intermediate movable holder 30. The pair of second slides 54Y slides in the moving direction (direction indicated by arrow P) of the leading movable holder 50 along the pair of guide arms 48.

As illustrated in FIG. 7, the first slide 54X includes an outer side face 54X1 facing an inner side face 34A (see FIG. 6) of the coupling arm 34 of the intermediate movable holder 30. The outer side face 54X1 is provided with a slide projection part 72 and a pair of claw parts 74.

The slide projection part 72 is disposed on the outer side face 54X1 of the first slide 54X on the side of the joining part 54Z. The slide projection part 72 is projected from the outer side face 54X1 of the first slide 54X and inserted into the guide groove 36 (see FIG. 6) of the coupling arm 34 of the intermediate movable holder 30 in a slidable manner. As the slide projection part 72 slides along the guide groove 36, the leading movable holder 50 moves between the retracted position and the extended position. The slide projection part 72 is formed in an elliptic cylinder shape long in the longitudinal direction of the guide groove 36. This shape restrict rotation of the slide projection parts 72 around the pair of coupling arms 34.

FIG. 4 illustrates a state (housed state) where the leading movable holder 50 is located at the retracted position. In this state, the joining parts 54Z of the leading movable holder 50 are in contact with the stopper part 40 of the intermediate movable holder 30. This restricts movement of the leading movable holder 50 in a direction (retracted direction or direction indicated by arrow P2) opposite to the extended position.

The cable housing part 30A is formed between the joining parts 54Z of the leading movable holder 50 and the holder body 32 of the intermediate movable holder 30 by the stopper part 40. A width W1 of the cable housing part 30A is, for example, equal to or larger than a diameter of the cable 20. Thus, when the leading movable holder 50 is located at the retracted position, at least one cable 20 may be housed in the cable housing part 30A of the intermediate movable holder 30.

On the other hand, FIG. 5 illustrates a state (extended state) where the leading movable holder 50 is located at the extended position. In this state, the slide projection parts 72 of the leading movable holder 50 are in contact with edge parts 36A (see FIG. 6) in the drawing direction (arrow P1) of the guide grooves 36 of the intermediate movable holder 30. This restricts movement of the leading movable holder 50 in a direction opposite to the retracted position.

When the leading movable holder 50 is located at the extended position, the first slides 54X of the leading movable holder 50 are supported by distal end parts 34T of the pair of coupling arms 34 of the intermediate movable holder 30. Further, a housing opening 30B is formed between the joining parts 54Z of the leading movable holder 50 and the distal end parts 48T of the pair of guide arms 48 of the intermediate movable holder 30. Thus, the cable 20 may be housed in the cable housing part 30A of the intermediate movable holder 30 through the housing opening 30B.

An extension length L1 of the pair of coupling arms 34 extending from the holder body 32 is longer than an extension length L2 of the pair of guide arms 48 extending from the holder body 32. Thus, when the leading movable holder 50 is coupled to the distal end parts 34T of the pair of coupling arms 34 of the intermediate movable holder 30, the housing opening 30B is formed between the joining parts 54Z of the leading movable holder 50 and the distal end parts 48T of the pair of guide arms 48 of the intermediate movable holder 30.

Figure 9:
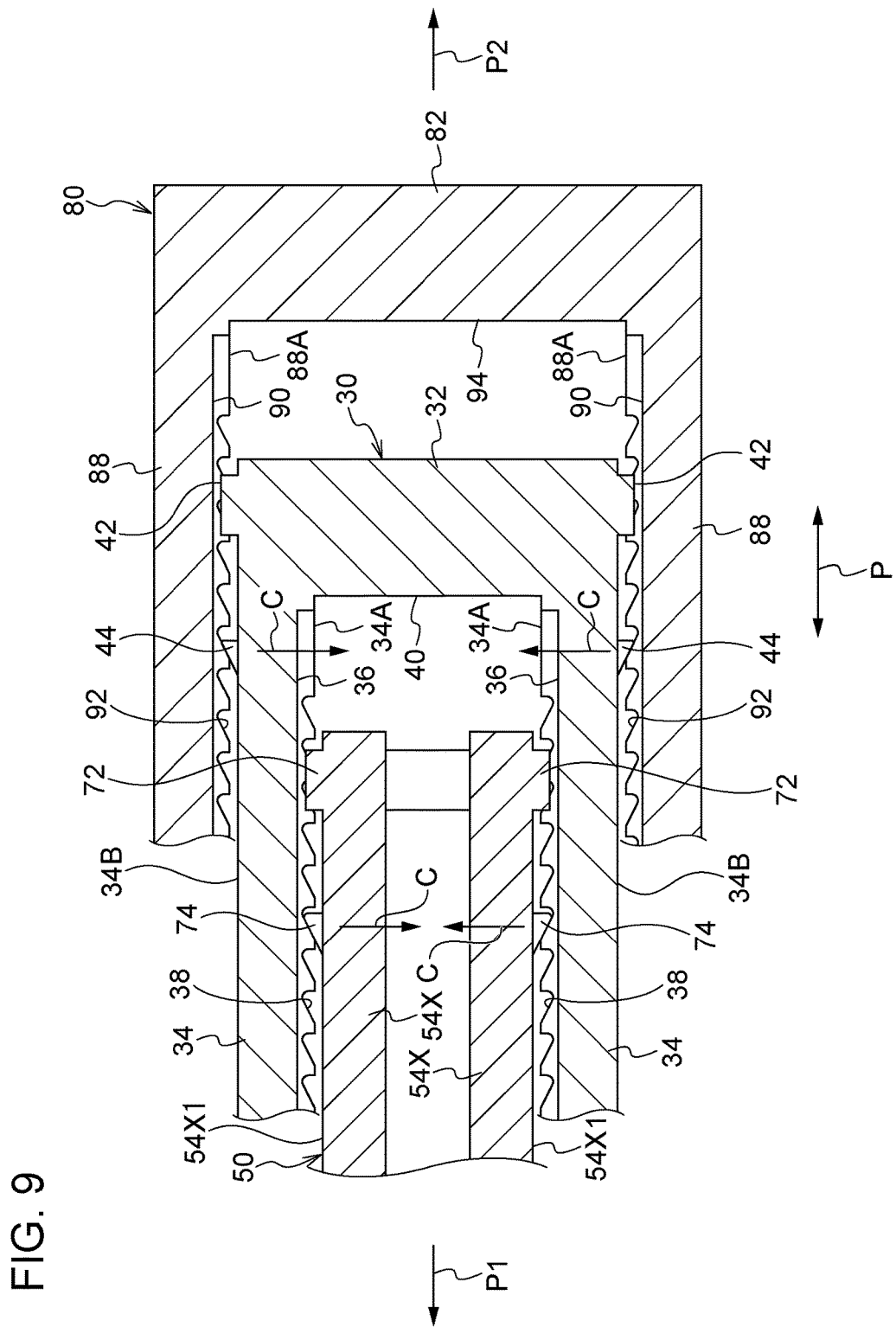
FIG. 9 is a cross section corresponding to a cross section taken along line IX-IX of FIG. 2.

As illustrated in FIG. 9, claw parts 74 of the pair of first slides 54X project from the outer side faces 54X1 of the first slide 54X and are locked to a plurality of tooth parts 38 of the intermediate movable holder 30 in a releasable manner. This locking of the claw parts 74 into the tooth parts 38 restricts movement of the leading movable holder 50 toward the retracted position (in the retracted direction or direction indicated by arrow P2).

Figure 10A:
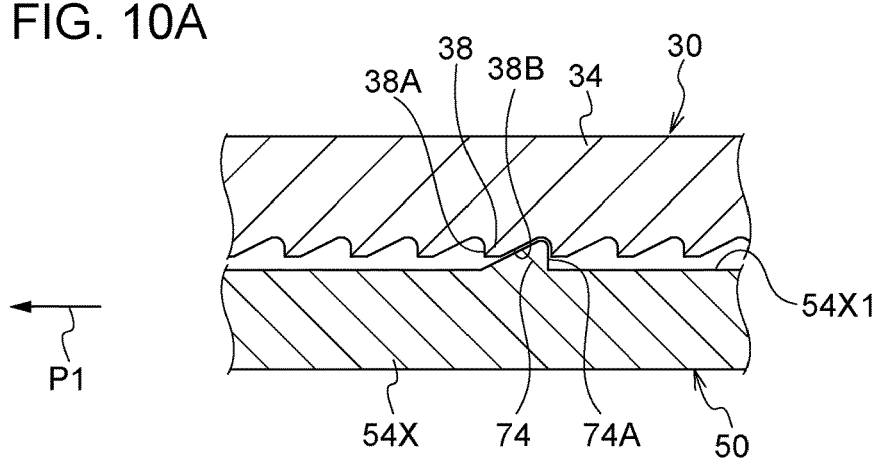
FIG. 10A is a partial expanded view of the intermediate movable holder and the leading movable holder illustrated in FIG. 9.
Figure 10B:
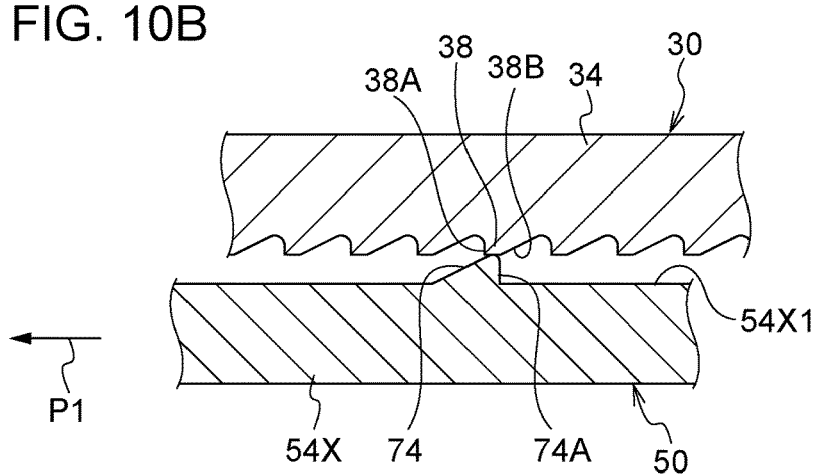
FIG. 10B is a cross section depicting a state where a claw part of the leading movable holder is moved toward the extended position with respect to a tooth part of the intermediate movable holder illustrated in FIG. 10A.
Figure 10C:
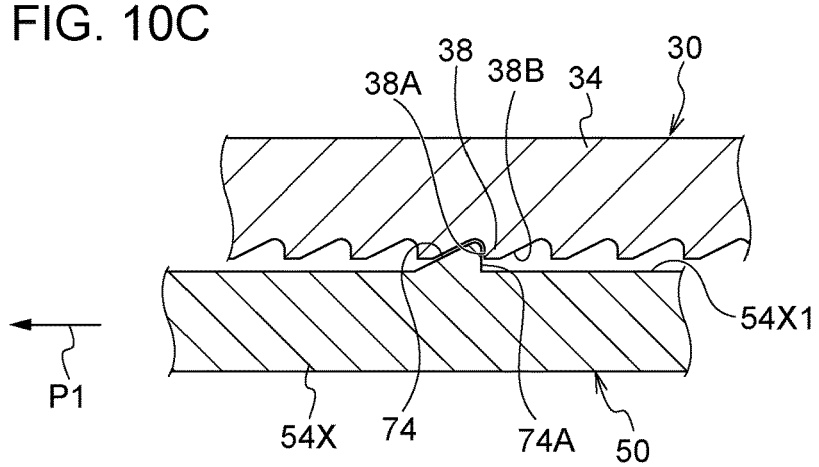
FIG. 10C is a cross section depicting a state where the claw part of the leading movable holder is locked to the tooth part of the intermediate movable holder illustrated in FIG. 10B.

Specifically, each of the claw parts 74 is formed in a cross-sectional triangle shape as illustrated in FIGS. 10A, 10B, and 10C. The claw part 74 includes a locking face 74A. The locking face 74A is a face directed toward the retracted position (in the retracted direction or direction indicated by arrow P2).

The tooth part 38 is formed in a cross-sectional triangle shape. The tooth part 38 includes a locked face 38A and an inclined face 38B. The locked face 38A is a face directed to the extended position of the leading movable holder 50 (in the extending direction or direction indicated by arrow P1). The locking face 74A of the claw part 74 is locked to the locked face 38A. Thus, movement of the leading movable holder 50 toward the retracted position (in the retracted direction or direction indicated by arrow P2) is restricted. The inclined face 38B is inclined in the moving direction (in the direction indicated by arrow P) of the leading movable holder 50 such that the claw part 74 moving in the drawing direction may run thereon. This allows movement of the leading movable holder 50 toward the extended position (in the extending direction or direction indicated by arrow P1).

As illustrated in FIG. 3, each of the pair of first slides 54X of the leading movable holder 50 is provided with an operating projection part 76. The operating projection parts 76 project from joining part 54Z sides of the first slides 54X into the cable housing part 50A toward the second slides 54Y. When the operator nips the pair of operating projection parts 76 from both sides, the locking of the locking faces 74A of the claw parts 74 to the locked faces 38A of the tooth parts 38 is released.

Figure 11A:
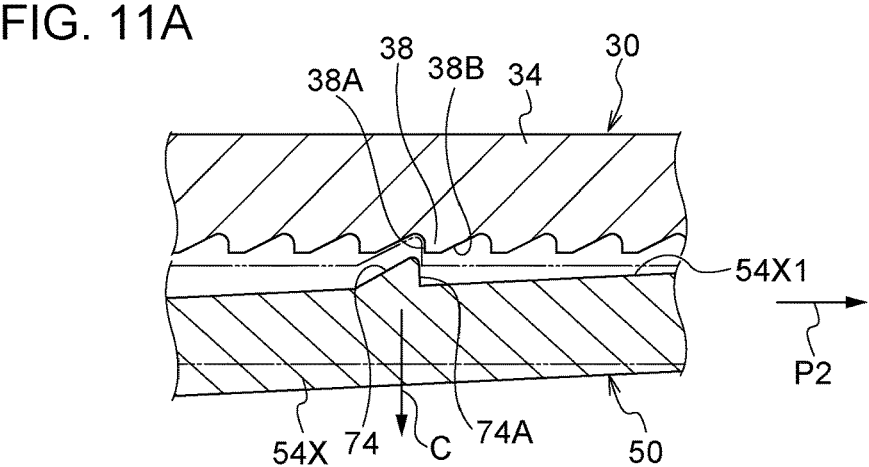
FIG. 11A is a cross section corresponding to the partial expanded cross section of FIG. 9 depicting a state where locking of the claw part of the leading movable holder to the tooth part of the intermediate movable holder illustrated in FIG. 9 is released.
Figure 11B:
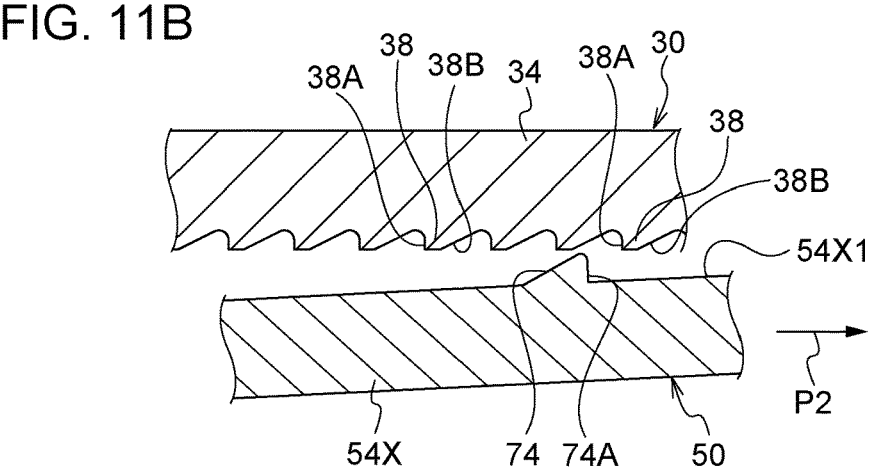
FIG. 11B is a cross section depicting a state where the claw part of the leading movable holder is moved toward the retracted position with respect to the tooth part of the intermediate movable holder illustrated in FIG. 11A.

Specifically, the operator nips the pair of operating projection parts 76 from both sides and causes the pair of first slides 54X to elastically deform inward (in the direction indicated by arrow c) such that the pair of first slides 54X approach to each other, as illustrated in FIG. 9. Thus, as illustrated in FIG. 11A, the locking of the locking faces 74A of the claw parts 74 to the locked faces 38A of the tooth parts 38 is released. As a result, as illustrated in FIG. 11B, the leading movable holder 50 is movable in the retracted direction (in the direction indicated by arrow P2) with respect to the intermediate movable holder 30.

Figure 11C:
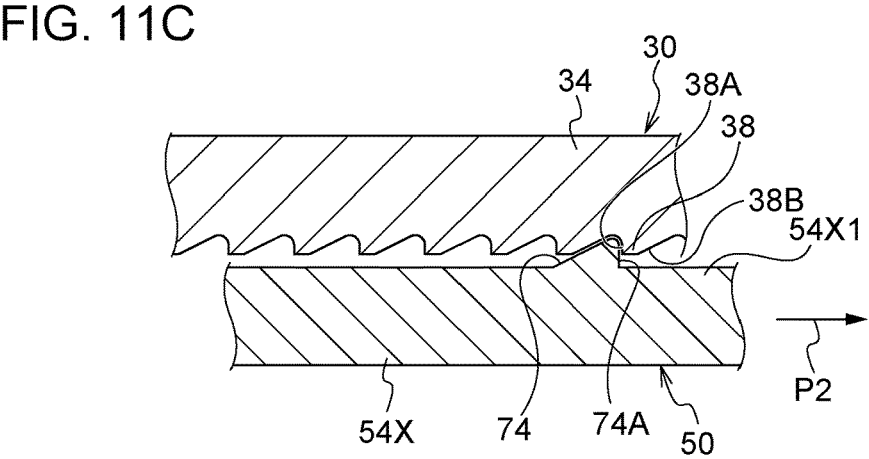
FIG. 11C is a cross section depicting a state where the claw part of the leading movable holder is locked to the tooth part of the intermediate movable holder illustrated in FIG. 11B.

When the operator releases his/her hands from the pair of operating projection parts 76 and restores the pair of first slides 54X into an original shape as illustrated in FIG. 11C, the locking face 74A of the claw part 74 is locked to the locked face 38A of the tooth part 38. This restricts movement of the leading movable holder 50 toward the retracted position.

Each of the operating projection parts 76 also functions as a cable holding part that holds the cable 20 in conjunction with the joining part 54Z.

[Fixed Holder]

Figure 12:
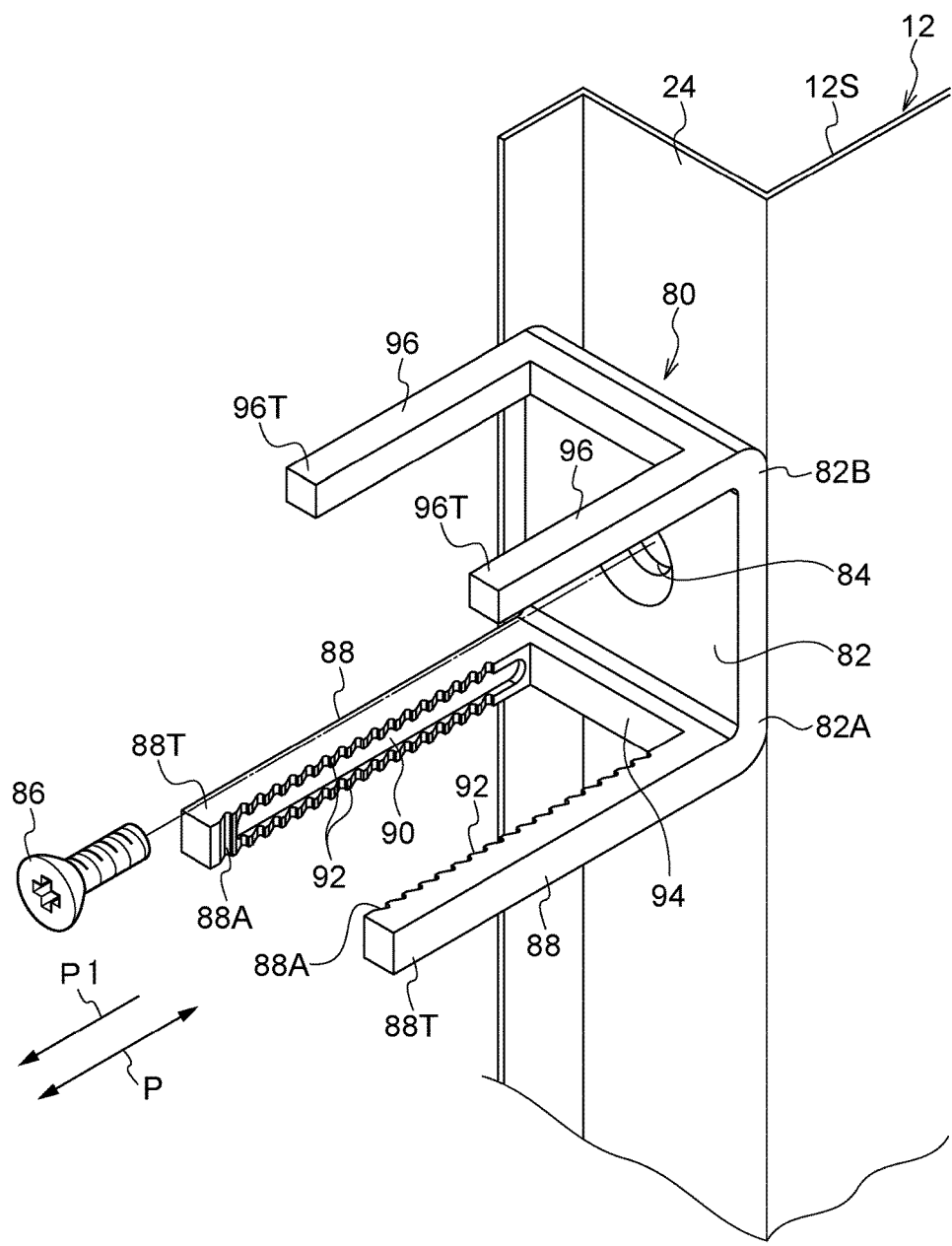
FIG. 12 is a perspective view of the fixed holder illustrated in FIG. 2.

As illustrated in FIG. 12, the fixed holder 80 includes a holder body 82, a pair of coupling arms 88, and a pair of guide arms 96. The holder body 82 is formed in a wall state. A mounting hole 84 is formed on the holder body 82. A screw 86 inserted into the mounting hole 84 fixes the holder body 82 into a flange part 24 of a sidewall 12S of the casing 12.

As illustrated in FIG. 3, the holder body 82 is spaced out from the intermediate movable holder 30 in the moving direction (in the direction indicated by arrow P) of the intermediate movable holder 30. The cable housing part 80A is formed (defined by) between the holder body 82 and intermediate movable holder 30. The cable housing part 80A is expanded and contracted with movement of the intermediate movable holder 30. The holder body 82 is an example of a third holder body. The cable housing part 80A is an example of a third cable housing part.

A pair of coupling arms 88 is provided at one end 82A of the holder body 82 with a space interposed between the coupling arms 88. The pair of coupling arms 88 extends from the one end 82A of the holder body 82 to both sides of the intermediate movable holder 30. That is, the intermediate movable holder 30 is disposed between the pair of coupling arms 88. The pair of coupling arms 88 is an example of a pair of coupling extension parts.

As illustrated in FIG. 12, the pair of coupling arms 88 includes a pair of inner side faces 88A facing each other. A guide groove 90 extending in the longitudinal direction of the coupling arms 88 is formed on each of the pair of inner side faces 88A. A slide projection part 42 (see FIG. 6) of the intermediate movable holder 30 is inserted into the pair of guide grooves 90 in a slidable manner. A plurality of tooth parts 92 are formed on each of both sides of the guide groove 90 of each of the inner side faces 88A. The plurality of tooth parts 92 are arrayed in the longitudinal direction of the coupling arms 88. The claw part 44 (see FIG. 6) of the intermediate movable holder 30 is locked to each of the tooth parts 92.

A stopper part 94 is provided between the pair of coupling arms 88. The stopper part 94 is provided along the one end 82A of the holder body 82. The stopper part 94 is in contact with the holder body 32 of the intermediate movable holder 30 located at the retracted position.

A pair of guide arms 96 is provided at another end 82B of the holder body 82 with a space interposed between the guide arms 96. The pair of guide arms 96 extends from the other end 82B of the holder body 82 to both sides of the intermediate movable holder 30. The pair of guide arms 96 faces the pair of coupling arms 88, respectively. The cable housing part 80A is formed (defined by) between the pair of guide arms 96 and the pair of coupling arms 88.

The pair of guide arms 96 is an example of a pair of guiding extension parts. The cable housing part 80A is an area (space) enclosed by the holder body 82, coupling arms 88, guide arms 96, and the holder body 32 of the intermediate movable holder 30.

As illustrated in FIG. 9, a slide projection part 42 and a pair of claw parts 44 are provided on each of the outer side faces 34B of the pair of coupling arms 34 of the intermediate movable holder 30. The slide projection part 42 is projected from the outer side face 34B of the coupling arm 34 and inserted into a guide groove 90 (see FIG. 12) of the coupling arm 88 of the fixed holder 80 in a slidable manner. As the slide projection part 42 slides along the guide groove 90, the intermediate movable holder 30 moves between the retracted position and the extended position.

Each of the claw parts 44 is locked to one of a plurality of tooth parts 92 of the fixed holder 80 in a releasable manner. This locking of the pair of claw parts 44 into some of the plurality of tooth parts 92 of the fixed holder 80 restricts movement of the intermediate movable holder 30 toward the retracted position. The slide projection part 42 and the pair of claw parts 44 of the intermediate movable holder 30 have the same configuration as the slide projection part 72 and claw parts 74 of the leading movable holder 50.

Further, as illustrated in FIG. 6, an operating projection part 46 is provided on each of the pair of coupling arms 34 of the intermediate movable holder 30. The operating projection parts 46 project from the holder body 32 sides of the pair of the coupling arms 34 into the cable housing part 30A toward the guide arms 48. When the operator nips the pair of operating projection parts 46 from both sides, the locking of the locking faces 74A of the claw parts 44 to the locked faces 38A of the tooth part 92 is released.

Each of the operating projection parts 46 also functions as a cable holding part that holds the cable 20 in conjunction with the holder body 32. That is, the operating projection part 46 is an example of a cable holding part.

FIG. 4 illustrates a state (housed state) in which the intermediate movable holder 30 is located at the retracted position. In this state, the holder body 32 of the intermediate movable holder 30 is in contact with the stopper part 94 of the fixed holder 80. This restricts movement of the intermediate movable holder 30 in a direction (direction indicated by arrow P2) opposite to the extended position.

The cable housing part 80A is formed between the holder body 32 of the intermediate movable holder 30 and the holder body 82 of the fixed holder 80 by the stopper part 94. A width W2 of the cable housing part 80A is, for example, equal to or larger than a diameter of the cable 20. Thus, when the intermediate movable holder 30 is located at the retracted position, at least one cable 20 may be housed in the cable housing part 80A in conjunction with the intermediate movable holder 30.

On the other hand, FIG. 5 illustrates a state (extended state) in which the intermediate movable holder 30 is located at the extended position. In this state, the coupling arms 34 of the intermediate movable holder 30 are supported by distal end parts 88T of the pair of coupling arms 88 of the fixed holder 80. A housing opening 80B is formed between the holder body 32 of the intermediate movable holder 30 and the distal end parts 96T of the pair of guide arms 96 of the fixed holder 80. Thus, the cable 20 may be housed in the cable housing part 80A of the fixed holder 80 through the housing opening 80B.

An extension length L3 of the pair of coupling arms 88 extending from the holder body 82 of the fixed 80 holder is longer than an extension length L4 of the pair of guide arms 96 extending from the holder body 82. Thus, when the intermediate movable holder 30 is coupled to the distal end parts 88T of the pair of coupling arms 88 of the fixed holder 80, the housing opening 80B is formed between the holder body 32 of the intermediate movable holder 30 and the distal end parts 96T of the pair of guide arms 96 of the fixed holder 80.

Next, a method of housing the cable 20 into the cable housing part 50A of the leading movable holder 50 is described.

As illustrated in FIG. 8A, the operator rotates the operation piece 66 toward the lid part 62 (in the direction indicated by arrow a) with the lock hinge 64 as a center. This releases the locking between the locking claw 68 and the locking groove 70.

Next, as illustrated in FIG. 8B, with the locking between the locking claw 68 and locking groove 70 released, the operator rotates the lid part 62 toward the outside (in the direction indicated by arrow b) of the cable housing part 50A with the open/close hinge 60 as a center. With this operation, the housing opening 50B of the holder body 52 is opened.

Next, the operator inserts the cable 20 into the cable housing part 50A through the housing opening 50B. With this operation, the cable 20 is housed in the cable housing part 50A. Next, the operator rotates the lid part 62 toward the cable housing part 50A with the open/close hinge 60 as a center to lock the locking claw 68 into the locking groove 70. With this operation, the lid part 62 is held with the housing opening 50B closed. As a result, run-out of the cable 20 from the housing opening 50B is suppressed.

Next, a method of housing the cable 20 into the cable housing part 30A of the intermediate movable holder 30 is described.

As illustrated in FIGS. 3 and 5, the operator draws the leading movable holder 50 from the cable housing part 30A of the intermediate movable holder 30 in the drawing direction (in the direction indicated by arrow P1) to move the leading movable holder 50 from the retracted position to the extended position. In this operation, a pair of slide projection parts 72 (see FIG. 9) of the leading movable holder 50 moves along the pair of guide grooves 36 of the intermediate movable holder 30, respectively. Also, a pair of second slides 54Y of the leading movable holder 50 moves along the pair of guide grooves 48 of the intermediate movable holder 30. That is, movement of the leading movable holder 50 is guided by the pair of guide grooves 36 and the pair of guide arms 48.

The slide projection part 72 is formed in an elliptic cylinder shape long in the longitudinal direction of the guide groove 36. Thus, rotation of the slide projection part 72 within the guide groove 36 is suppressed. As a result, the leading movable holder 50 moves substantially in parallel from the retracted position to the extended position.

Further, when the leading movable holder 50 moves from the retracted position to the extended position, as illustrated in FIGS. 10A to 10C, claw parts 74 of the leading movable holder 50 slide on an inclined face 38B of the tooth part 38 of the intermediate movable holder 30 and rides over the tooth part 38. Consequently, the operator may move the leading movable holder 50 from the retracted position to the extended position by just drawing the leading movable holder 50 in the drawing direction.

In the state where the leading movable holder 50 is located at the extended position, a housing opening 30B is formed between the holder body 52 of the leading movable holder 50 and the distal end parts 48T of the pair of guide arms 48 of the intermediate movable holder 30. The operator places the cable 20 into the cable housing part 30A through the housing opening 30B. In this operation, the operator may insert the cable 20 between the operating projection part 46 and the holder body 32 and hook the cable 20 on the operating projection part 46.

Next, the operator closes the housing opening 30B of the intermediate movable holder 30. Specifically, the operator nips the pair of operating projection parts 76 of the leading movable holder 50 from both sides and causes the pair of first slides 54X to elastically deform inward (in the direction indicated by arrow c) such that the pair of first slides 54X approach to each other, as illustrated in FIG. 9. Thus, as illustrated in FIG. 11A, the locking of the locking faces 74A of the claw parts 74 of the leading movable holder 50 to the locked faces 38A of the tooth parts 38 of the intermediate movable holder 30 is released.

In this state, as illustrated in FIG. 11B, the operator pushes the leading movable holder 50 in the retracted direction (in the direction indicated by arrow P2) to move the leading movable holder 50 from the extended position to the retracted position. In this operation, a pair of slide projection parts 72 of the leading movable holder 50 slides along the pair of guide grooves 36 of the intermediate movable holder 30. That is, movement of the leading movable holder 50 from the extended position to the retracted position is guided by the pair of guide grooves 36 of the intermediate movable holder 30.

Also, as the leading movable holder 50 moves from the extended position to the retracted position, the second slides 54Y of the leading movable holder 50 are inserted between the pair of guide grooves 48 of the intermediate movable holder 30. With this operation, the housing opening 30B is closed. In this state, when the operator further pushes the leading movable holder 50 in the retracted direction (in the direction indicated by arrow P2), a pair of second slides 54Y of the leading movable holder 50 moves along the pair of guide grooves 48 of the intermediate movable holder 30.

That is, movement of the leading movable holder 50 from the extended position to the retracted position is guided by the pair of guide arms 48 of the intermediate movable holder 30.

When the operator releases his/her hands from the pair of operating projection parts 76 to restore the pair of first slides 54X into an original shape as illustrated in FIG. 11C, the locking face 74A of the claw part 74 is locked to the locked face 38A of the tooth part 38. Thus, movement of the leading movable holder 50 toward the retracted position is restricted.

When the leading movable holder 50 reaches the retracted position, the holder body 52 of the leading movable holder 50 comes into contact with the stopper part 40 of the intermediate movable holder 30 to restrict movement of the leading movable holder 50 in a direction opposite to the extended position. Thus, the cable housing part 30A is formed between the holder body 52 of the leading movable holder 50 and the holder body 32 of the intermediate movable holder 30. As a result, sandwiching of the cable 20 between the holder body 52 of the leading movable holder 50 and the holder body 32 of the intermediate movable holder 30 is suppressed. That is, breakage or the like of the cable 20 is suppressed.

The cable 20 is housed in the cable housing part 80A of the fixed holder 80 according to the same procedure as the above-mentioned method of housing the cable 20 into the cable housing part 30A of the intermediate movable holder 30.

Next, advantageous effects of the embodiment are described.

According to the embodiment, the cable holder 22 includes the leading movable holder 50, the intermediate movable holder 30, and the fixed holder 80. The leading movable holder 50, the intermediate movable holder 30, and the fixed holder 80 includes their respective cable housing parts 50A, 30A, and 80A. The cable 20 may be housed in each of the cable housing parts 50A, 30A, and 80A. Thus, entangling of a plurality of cables 20 is suppressed.

The leading movable holder 50 is housed in the cable housing part 30A of the intermediate movable holder 30. In the same manner, the intermediate movable holder 30 is housed in the cable housing part 80A of the fixed holder 80. Consequently, the cable holder 22 may be down-sized.

The leading movable holder 50 has a cable housing part 50A formed between the first slides 54X and second slides 54Y. The first slides 54X are disposed between the pair of coupling arms 34 of the intermediate movable holder 30, and the second slides 54Y are disposed between the pair of guide arms 48 of the intermediate movable holder 30. With such configuration, the size of the cable housing part 50A of the leading movable holder 50 may be made equivalent to the cable housing part 30A of the intermediate movable holder 30. Consequently, more cables 20 may be housed in the cable housing part 50A of the leading movable holder 50.

The first slide 54X of the leading movable holder 50 is provided with the operating projection part 76 projecting into the cable housing part 50A. The cable 20 is inserted between the operating projection part 76 and the joining part 54Z to hold the cable 20 at a predetermined position within the cable housing part 50A. Consequently, housing of the cable 20 into the cable housing part 50A of the leading movable holder 50 is further facilitated.

When the leading movable holder 50 is moved from the retracted position to the extended position, the cable housing part 30A of the intermediate movable holder 30 is expanded. Further, in the state where the leading movable holder 50 is located at the extended position, the housing opening 30B is formed between the holder body 52 of the leading movable holder 50 and the distal end parts 48T of the pair of guide arms 48 of the intermediate movable holder 30. The cable 20 may be housed in the cable housing part 30A of the intermediate movable holder 30 through the housing opening 30B. Consequently, housing of the cable 20 into the cable housing part 30A of the intermediate movable holder 30 is facilitated.

On the other hand, when the leading movable holder 50 is located at the retracted position, the housing opening 30B of the intermediate movable holder 30 is closed. Thus, drop-out of the cable 20 from the cable housing part 30A of the intermediate movable holder 30 may be suppressed.

Further, when the leading movable holder 50 is located at the retracted position, the joining parts 54Z of the leading movable holder 50 are in contact with the stopper part 40 of the intermediate movable holder 30, to restrict movement of the leading movable holder 50 in a direction opposite to the extended position. As a result, the cable housing part 30A of the intermediate movable holder 30 is formed between the joining parts 54Z of the leading movable holder 50 and the holder body 32 of the intermediate movable holder 30. Consequently, breakage or the like of the cable 20 housed in the cable housing part 30A of the intermediate movable holder 30 is suppressed.

As illustrated in FIG. 9, a claw part 74 is provided on each of the pair of first slides 54X of the leading movable holder 50. In the state where the locking face 74A of the claw part 74 is locked to the locked face 38A of the tooth part 38 of the intermediate movable holder 30, movement of the leading movable holder 50 toward the retracted position (in the retracted direction or direction indicated by arrow P2) is restricted. Thus, even when the operator pushes the leading movable holder 50 toward the retracted position by mistake, the leading movable holder 50 is kept from moving toward the retracted position and closing the housing opening 30B. Consequently, housing of the cable 20 into the cable housing part 30A of the intermediate movable holder 30 is further facilitated.

Further, the claw parts 44 are provided on each of the pair of coupling arms 34 of the intermediate movable holder 30. When the locking faces of the claw parts 44 are locked to the locked faces of a plurality of tooth parts 92 of the fixed holder 80, movement of the intermediate movable holder 30 toward the retracted position (in the retracted direction or direction indicated by arrow P2) is restricted.

Figure 13:
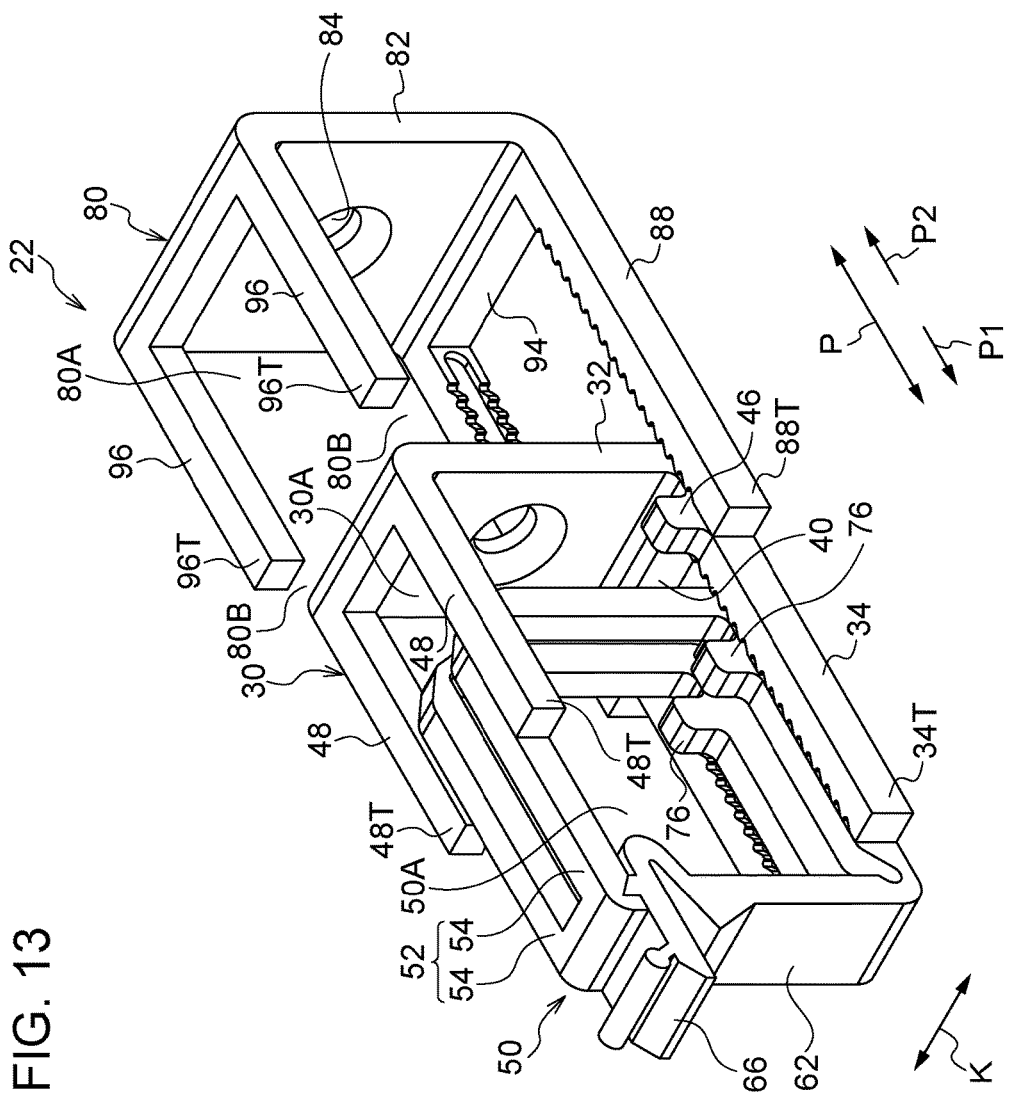
FIG. 13 is a perspective view depicting a state where the intermediate movable holder of the cable holder illustrated in FIG. 1 is located at the extended position, and the leading movable holder is located at the retracted position.

Thus, for example, as illustrated in FIG. 13, when the operator moves the leading movable holder 50 from the extended position to the retracted position, movement of the intermediate movable holder 30 from the extended position to the retracted position against the operator's intention is suppressed. In the same manner, when the operator moves the intermediate movable holder 30 from the extended position to the retracted position, movement of the leading movable holder 50 from the extended position to the retracted position against the operator's intention is suppressed. Consequently, housing of the cable 20 into the cable housing part 30A of the intermediate movable holder 30 and the cable housing part 80A of the fixed holder 80 is facilitated.

Effects of the embodiment are described above by using the leading movable holder 50 and the intermediate movable holder 30 as examples. However, the same effects also may be obtained for the fixed holder 80.

Modified Examples

Next, modified examples of the above embodiment are described. Modified examples of the leading movable holder 50 and the intermediate movable holder 30 described below also may be applied to the intermediate movable holder 30 and the fixed holder 80 as appropriate.

In the above embodiment, movement of the leading movable holder 50 toward the retracted position (in the retracted direction or direction indicated by arrow P2) relative to the intermediate movable holder 30 is restricted by the claw parts 74 and a plurality of tooth parts 38. However, reversely from the above embodiment, movement of the leading movable holder 50 toward the extended position (in the extended position or direction indicated by arrow P1) relative to the intermediate movable holder 30 may be restricted, for example, by claw parts and a plurality of tooth parts. In the same manner, movement of the intermediate movable holder 30 toward the extended position (in the extending direction or direction indicated by arrow P1) relative to the fixed holder 80 may be restricted by claw parts and a plurality of tooth parts.

Figure 14:
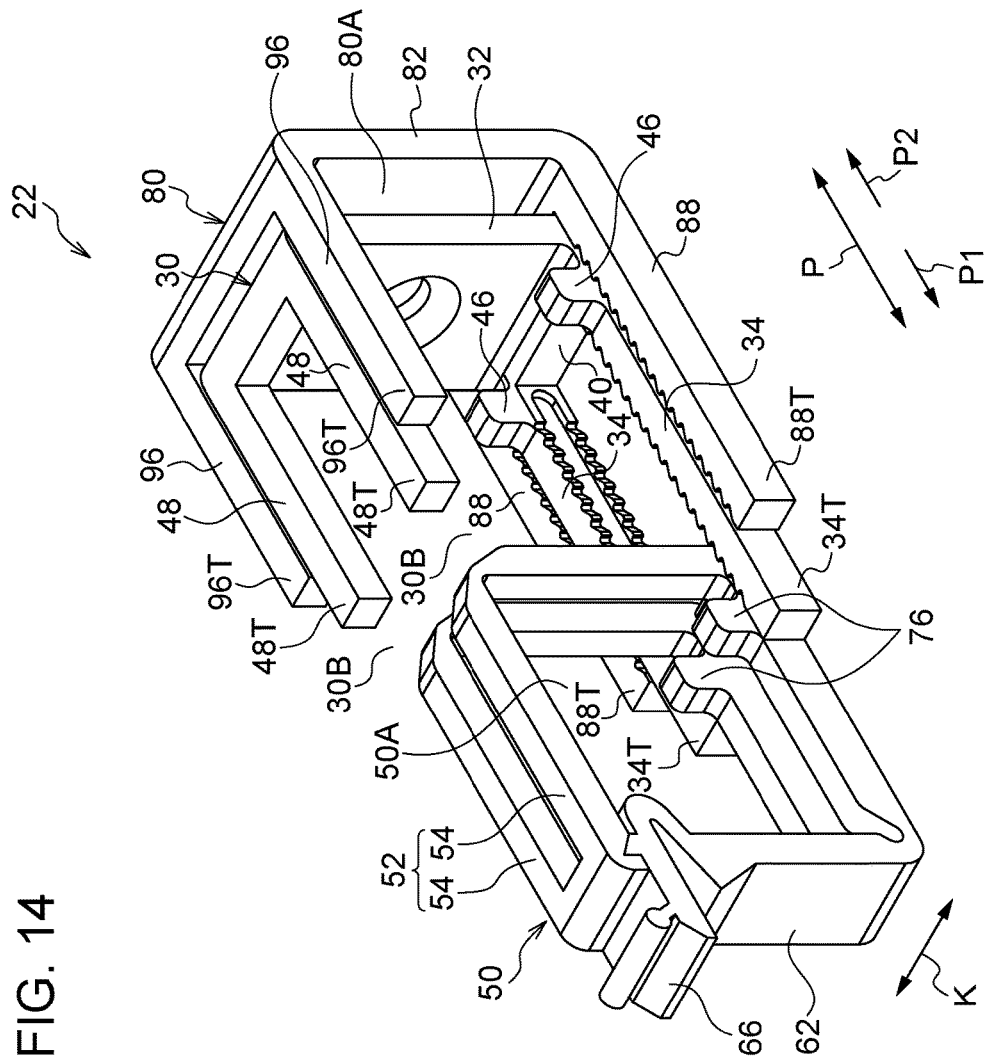
FIG. 14 is a perspective view depicting a state where the intermediate movable holder of the cable holder illustrated in FIG. 1 is located at the retracted position, and the leading movable holder is located at the extended position.

In this case, as illustrated in FIG. 14, for example, when the operator moves the leading movable holder 50 to the extended position to pick out the cable 20 from the cable housing part 30A of the intermediate movable holder 30, movement of the intermediate movable holder 30 toward the extended position is suppressed. That is, when the operator picks out the cable 20 from the cable housing part 30A of the intermediate movable holder 30, run-out of the cable 20 from the cable housing part 80A of the fixed holder 80 due to release of the housing opening 80B of the fixed holder 80 against the operator's intention is suppressed.

In the same manner, when the operator picks out the cable 20 from the cable housing part 80A of the fixed holder 80, run-out of the cable 20 from the cable housing part 30A of the intermediate movable holder 30 due to release of the housing opening 30B of the intermediate movable holder 30 against the operator's intention is suppressed. Consequently, replacement or the like of the cable 20 into the cable housing part 30A of the intermediate movable holder 30 and the cable housing part 80A of the fixed holder 80 is facilitated. The claw parts 74 and the plurality of tooth parts 38 may be omitted.

In the above embodiment, movement of the leading movable holder 50 between the retracted position and extended position is guided by slide projection parts 72 and guide grooves 36. However, movement of the leading movable holder 50 between the retracted position and extended position may be guided by another guide mechanism.

In the above embodiment, when the leading movable holder 50 is drawn from the cable housing part 30A of the intermediate movable holder 30, the housing opening 30B is formed between the leading movable holder 50 and the pair of guide arms 48 of the intermediate movable holder 30. However, the housing opening 30B may be omitted. In this case, the operator may place the cable 20 into the cable housing part 30A by inserting an end portion of the cable 20 into the cable housing part 30A of the intermediate movable holder 30.

When the leading movable holder 50 is moved from the retracted position to the extended position, the cable housing part 30A of the intermediate movable holder 30 is expanded. Consequently, for example, even when a connector or the like is inserted into an end portion of the cable 20, the end portion of the cable 20 may be easily inserted into the cable housing part 30A.

In the above embodiment, a portion of the leading movable holder 50 is housed in the cable housing part 30A of the intermediate movable holder 30. However, the cable housing part of the intermediate movable holder may be configured to house a whole of the leading movable holder.

In the above embodiment, the operating projection part 76 projects from the first slide 54X of the leading movable holder 50 into the cable housing part 50A. However, the operating projection part 76 may project from the first slide 54X of the leading movable holder 50 to a side opposite to the cable housing part 50A.

In the above embodiment, the operating projection part 76 also functions as the cable holding part. However, the operating projection part 76 and the cable holder may be separated from each other. The cable holding part may be provided on at least one of the first slide 54X and second slide 54Y.

The cable holder 22 according to the above embodiment includes three holders: the leading movable holder 50, the intermediate movable holder 30, and the fixed holder 80. However, the fixed holder 80 may be omitted. In this case, the intermediate movable holder 30 serves as the fixed holder and is mounted in the casing 12 of the information processing apparatus 10. The cable holder may be configured with four or more holders.

Mounting direction of the cable holder 22 with respect to the casing 12 may be changed as appropriate. For example, the holder body 82 of the fixed holder 80 may be fixed onto the upper surface of the casing 12. In this case, the leading movable holder 50 is moved vertically (in the gravity direction) with respect to the intermediate movable holder 30.

In the above embodiment, the cable holder 22 is mounted in the casing 12 of the information processing apparatus 10. However, the cable holder 22 may be mounted onto a rack or the like configured to accommodate the electronic device, but not limited to the information processing apparatus 10.

One embodiment of the technique disclosed by the present application is described above. However, the technique disclosed by the present application is not limited to the embodiment described above. The above embodiments and various modified examples may be used in combination as appropriate, and it is obvious that the technique disclosed by the present application may be implemented in various embodiments within a scope not deviating from the spirit thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cable holder comprising:
   a first holder configured to house a cable and having a pair of coupling arms extending from one side of the first holder body to couple with a second holder so that the second holder is movable along the pair of coupling arms; and
   the second holder configured to house the cable, the second holder being at least partly housed between the coupling arms of the first holder.

2. The cable holder according to claim 1, wherein
the second holder forms a housing opening for housing the cable in conjunction with the first holder when the second holder is drawn from the first holder, and
the second holder closes the housing opening when the second holder is housed in the first housing part.

3. The cable holder according to claim 2, wherein
the first holder includes:
a first holder body spaced out from the second holder in a moving direction of the second holder,
a coupling extension part extending from the first holder body, and
a guiding extension part extending from the first holder body and forming a first cable housing part to house the cable in conjunction with the coupling extension part,
the second holder is drawn from the first cable housing part along the coupling extension part and the guiding extension part, and
the second holder is coupled with the coupling extension part, and forms the housing opening in conjunction with a distal end part of the guiding extension part, when the second holder is drawn from the first cable housing part.

4. The cable holder according to claim 3, wherein
an extension length in which the coupling extension part extends from the first holder body is longer than an extension length in which the guiding extension part extends from the first holder body.

5. The cable holder according to claim 3, wherein
the first holder includes a cable holding part configured to project into the first cable housing part from at least one of the coupling extension part and the guiding extension part so as to hold a cable in conjunction with the first holder body.

6. The cable holder according to claim 3, wherein
the pair of coupling arms includes:
a pair of inner side faces facing each other, and
a pair of guide grooves formed on the pair of inner side faces, respectively, and extending along the pair of coupling arms, and
the second holder includes a pair of slide projection parts inserted into the pair of guide grooves, respectively, so that the second holder is movable along the pair of guide grooves.

7. The cable holder according to claim 6, wherein
the pair of slide projection parts is each formed in an elliptic cylinder shape long in a longitudinal direction of the pair of guide grooves.

8. The cable holder according to claim 6, wherein
the pair of coupling arms each includes a plurality of tooth parts formed on the inner side face of the pair of coupling arms, respectively, the plurality of tooth parts being arrayed in a longitudinal direction of the pair of coupling arms, respectively, and
the second holder includes claw parts locked to the tooth parts in a releasable manner to restrict movement of the second holder in a drawing direction from the first cable housing part and movement of the second holder in a retracted direction toward the first cable housing part.

9. The cable holder according to claim 8, wherein
the second holder includes a pair of slides facing the inner side faces of the pair of coupling arms, respectively, and are elastically deformed to come into and out of contact with the inner side faces, and
the claw parts are provided on each of the pair of slides.

10. The cable holder according to claim 3, wherein
the guiding extension part includes a pair of guide arms extending from the first holder body to the second holder,
the second holder is drawn from the first cable housing part along the pair of guide arms, and
the second holder forms the housing opening in conjunction with distal end parts of the pair of guide arms when the second holder is drawn from the first cable housing part.

11. The cable holder according to claim 3, wherein
the first holder includes a stopper part configured to come into contact with the second holder housed in the first cable housing part to restrict movement of the second holder in a retracted direction toward the first cable housing part.

12. The cable holder according to claim 3, wherein
the second holder includes an open/close mechanism configured to open and close a second cable housing part to house the cable.

13. The cable holder according to claim 12, wherein
the second holder includes:
a second holder body inside of which the second cable housing part is formed, a housing opening that communicates with the second cable housing part being provided on a side of the second holder body opposite to the first holder, and
a lid part connected via a hinge as the open/close mechanism to an end portion of the second holder body on the housing opening side to open and close the housing opening.

14. A cable holder comprising:
a first holder configured to house a cable;
a second holder configured to house the cable, the second holder being at least partly housed in the first holder; and
a third holder configured to house a cable,
wherein the second holder is held by the first holder, and drawn along the first holder, and
wherein the first holder is at least partly housed in the third holder, held by the third holder, and drawn along the third holder.

15. An information processing apparatus comprising:
a casing in which an electronic device connected with a plurality of cables is housed;
a first holder configured to house a cable of the plurality of cables, the first holder being mounted in the casing and having a pair of coupling arms extending from one side of the first holder body to couple with a second holder so that the second holder is movable along the pair of coupling arms; and
a second holder configured to house the cable, the second holder being at least partly housed between the coupling arms of the first holder.

* * * * *